(12) United States Patent
Jung et al.

(10) Patent No.: US 9,955,403 B2
(45) Date of Patent: Apr. 24, 2018

(54) METHOD FOR COMMUNICATING IN WIRELESS COMMUNICATION SYSTEM SUPPORTING MULTIPLE ACCESS NETWORK AND APPARATUS SUPPORTING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 14/649,514

(22) PCT Filed: Dec. 20, 2013

(86) PCT No.: PCT/KR2013/011980
§ 371 (c)(1),
(2) Date: Jun. 3, 2015

(87) PCT Pub. No.: WO2014/098532
PCT Pub. Date: Jun. 26, 2014

(65) Prior Publication Data
US 2015/0304936 A1 Oct. 22, 2015

Related U.S. Application Data

(60) Provisional application No. 61/740,394, filed on Dec. 20, 2012.

(51) Int. Cl.
*H04W 48/16* (2009.01)
*H04W 40/12* (2009.01)
(Continued)

(52) U.S. Cl.
CPC ............. *H04W 40/12* (2013.01); *H04L 45/22* (2013.01); *H04W 40/02* (2013.01); *H04W 48/18* (2013.01);
(Continued)

(58) Field of Classification Search
CPC ..... H04W 40/12; H04W 40/02; H04W 48/18; H04W 76/046; H04W 48/06; H04W 48/16; H04W 84/12; H04L 45/22
See application file for complete search history.

(56) References Cited

U.S. PATENT DOCUMENTS 6,141,410 A 10/2000 Ginzboorg
2005/0136937 A1* 6/2005 Qian .................... H04W 48/20
455/452.2
(Continued)

FOREIGN PATENT DOCUMENTS

CN 101179856 5/2008
CN 101517548 8/2009
(Continued)

OTHER PUBLICATIONS

Alcatel-Lucent, "Policy based terminal triggered, ANDSF decided access selection", 3GPP TSG SA WG2 Architecture-S2#63, S2-081658, Feb. 16, 2008, 6 pages.
(Continued)

*Primary Examiner* — Anez Ebrahim
*Assistant Examiner* — Omeed D Rahgozar
(74) *Attorney, Agent, or Firm* — Lee Hong Degerman Kang Waimey

(57) ABSTRACT

Provided is a method for communicating carried out by a terminal in a wireless communication system supporting a multiple access network. The method comprises receiving a traffic routing configuration from a first access network, wherein the traffic routing configuration involves specifying
(Continued)

traffic routing criteria, searching a second access network, determining whether a second access network entity discovered by the search satisfies the traffic routing criteria, and processing traffic on the first access network through the second access network entity when the traffic routing criteria are satisfied.

7 Claims, 15 Drawing Sheets

(51) Int. Cl.
*H04W 40/02* (2009.01)
*H04W 48/18* (2009.01)
*H04W 76/04* (2009.01)
*H04L 12/707* (2013.01)
*H04W 48/06* (2009.01)
*H04W 84/12* (2009.01)

(52) U.S. Cl.
CPC .......... *H04W 76/046* (2013.01); *H04W 48/06* (2013.01); *H04W 48/16* (2013.01); *H04W 84/12* (2013.01)

(56) References Cited

U.S. PATENT DOCUMENTS

| | | | | |
|---|---|---|---|---|
| 2011/0317571 A1* | 12/2011 | Kokkinen | ............. | H04W 24/00 370/252 |
| 2012/0003976 A1* | 1/2012 | Bhat | ................... | H04W 48/18 455/436 |
| 2015/0304906 A1* | 10/2015 | Nylander | .......... | H04W 36/0066 370/331 |

FOREIGN PATENT DOCUMENTS

| | | |
|---|---|---|
| CN | 102143560 | 8/2011 |
| EP | 2239953 A1 | 10/2010 |
| JP | 2004304399 A | 10/2004 |
| JP | 2007529920 A | 10/2007 |
| JP | 2009506712 A | 2/2009 |
| JP | 2009-206621 | 9/2009 |
| KR | 10-2009-0008387 | 1/2009 |
| KR | 10-2009-0023584 | 3/2009 |
| KR | 10-2009-0030008 | 3/2009 |
| RU | 2146427 C1 | 3/2000 |
| WO | 2005089249 A2 | 9/2005 |
| WO | 2007027129 A1 | 3/2007 |

OTHER PUBLICATIONS

Intel Corporation, "RAN Enhancements for 3GPP/WLAN Interworking Study Item Proposal", 3GPP TSG RAN meeting RAN3#77, R3-121847, Aug. 3, 2012, 4 pages.
LG Electronics Inc. et al.,"Text proposal on WLAN3GPP radio interworking solution 2", 3GPP TSG-RAN2 Meeting #82, R2-132193, May 24, 2013, 4 pages.
LG Electronics Inc., "Issues on relation with ANDSF", 3GPP TSG-RAN2 Meeting #82, R2-132057, May 11, 2013, 2 pages.
LG Electronics Inc., "Comparison of access network selection solutions", 3GPP TSG-RAN2 Meeting #82, R2-132055, May 11, 2013, 6 pages.
LG Electronics Inc. et al., "Text proposal on WLAN 3GPP radio interworking solution 2", 3GPP TSG-RAN2 Meeting #83, R2-132849, Aug. 10, 2013, 3 pages.
Qualcomm Incorporated, "RAN broadcast solutions for WLAN-RAN interworking", 3GPP TSG-RAN2#82, R2-132084, May 11, 2013, 3 pages.
European Patent Office Application No. 13865195.5, Search Report dated May 3, 2016, 12 pages.
Japanese Patent Office Application No. 2015-549265, Office Action dated Jun. 7, 2016, 4 pages.
PCT International Application No. PCT/KR2013/011980, Written Opinion of the International Searching Authority dated Mar. 31, 2014, 1 page.
Russian Patent Office Application No. 2015129564, Office Action dated Oct. 26, 2016, 6 pages.
The State Intellectual Property Office of the People's Republic of China Application Serial No. 201380067579.7, Office Action dated Nov. 1, 2017, 7 pages.

* cited by examiner

METHOD FOR COMMUNICATING IN WIRELESS COMMUNICATION SYSTEM SUPPORTING MULTIPLE ACCESS NETWORK AND APPARATUS SUPPORTING SAME

CROSS-REFERENCE TO RELATED APPLICATIONS

This application is the National Stage filing under 35 U.S.C. 371 of International Application No. PCT/KR2013/011980, filed on Dec. 20, 2013, which claims the benefit of U.S. Provisional Application No. 61/740,394, filed on Dec. 20, 2012, the contents of which are all hereby incorporated by reference herein in their entirety.

BACKGROUND OF THE INVENTION

Field of the Invention

The present invention relates to wireless communication, and more particularly, to a communication method performed in a wireless communication system supporting communication through a multiple access network and an apparatus supporting the same.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

The wireless communication system can support providing a service through a plurality of access networks to the terminal. The terminal can receive the service from a 3GPP based access network such as a mobile wireless communication system and further, receive a service from non-3GPP based access networks such as Worldwide Interoperability for Microwave Access (WiMAX), Wireless Local Area Network (WLAN), and the like.

Interworking between the 3GPP access network and the non-3GPP access network in the related art is a scheme in which the terminal selects the access network based on an access network discovery and selection functions (ANDSF) policy and processes traffic through the selected access network. In this scheme, a base station cannot control the interworking between the 3GPP access network and the non-3GPP access network. This cannot properly allocate a radio resource to the terminal that receives a service in a cell to cause a problem in that a quality of service (QoS) of the terminal deteriorates.

SUMMARY OF THE INVENTION

The present invention provides a method for communicating in a wireless communication system supporting a multiple access network and an apparatus supporting the same.

In one aspect, provided is a method for communicating, which is performed by a terminal in a wireless communication system supporting a multiple access network. The method includes receiving a traffic routing configuration from a first access network, the traffic routing configuration specifying a traffic routing criterion, searching a second access network, determining whether a second access network entity discovered by the search satisfies the traffic routing criterion and processing traffic of the first access network through the second access network entity when the traffic routing criterion is satisfied.

The traffic routing configuration may include a concerned second access network entity list specifying one or more concerned second access network entities in which the traffic processing of the first access network is permitted, and a routing event related with each entity of the concerned second access network entity list. The routing event may specify the traffic routing criterion for the second concerned second access network entity.

The routing event may specify the traffic routing criterion related with signal quality of the related concerned second access network entity.

The routing event may specify the traffic routing criterion related with a load of the related concerned second access network entity.

The routing event may specify the traffic routing criterion related with signal quality of the first access network with respect to the related concerned second access network entity.

The routing event may specify the traffic routing criterion related with a load of the first access network with respect to the related concerned second access network entity.

The searching of the second access network may include discovering the second access network entity included in the concerned second access network entity list.

The determining whether to satisfy the traffic routing criterion may include deciding that the traffic routing criterion is satisfied when the routing event related with the second access network entity is satisfied.

The processing of the traffic of the first access network through the second access network entity may include reporting information on the second access network entity to the first access network when the traffic routing criterion is satisfied, receiving a traffic routing indication indicating traffic routing through the second access network entity from the first access network, and routing and processing the traffic of the first access network to the second access network entity.

The information on the second access network entity may include at least one of identification information of the second access network entity, positional information of the second access network entity, signal specifying information of the second access network entity, channel information of the second access network entity, operating protocol information of the second access network entity, and priority information of the second access network entity.

The first access network may be a 3rd generation partnership project (3GPP) based access network, and the second access network may be a wireless local area network (WLAN) based access network.

The traffic routing configuration may be transmitted while being included in system information broadcasted from the first access network.

The traffic routing configuration may be transmitted while being included in a radio resource control (RRC) message transmitted from the first access network.

In another aspect, provided is a wireless apparatus that operates in a wireless communication system. The wireless apparatus comprises a first RF unit transmitting and receiving a first access network signal, a second RF unit transmitting and receiving a second access network signal and a processor that operates in functional combination with the first RF unit and the second RF unit. The processor is configured to receive a traffic routing configuration from a first access network, the traffic routing configuration specifying a traffic routing criterion, discover a second access network, determine whether a second access network entity discovered by the search satisfies the traffic routing criterion, and process traffic of the first access network through the second access network entity when the traffic routing criterion is satisfied.

According to a communication method of an exemplary embodiment of the present invention, a traffic routing criterion is provided to a terminal, and as a result, the terminal can determine a non-3GPP access network appropriate to traffic processing and process traffic through the corresponding non-3GPP access network. Further, the terminal can report to a network information on the non-3GPP access network determined according to the traffic routing criterion. The base station can allow the terminal to route some or all of 3GPP traffic to the appropriate non-3GPP access network and process the routed 3GPP traffic. The terminal routes and processes the traffic to the appropriate non-3GPP access network to guarantee service quality provided to the terminal and reduce a load of the 3GPP access network.

DESCRIPTION OF EXEMPLARY
EMBODIMENTS

Figure 1:
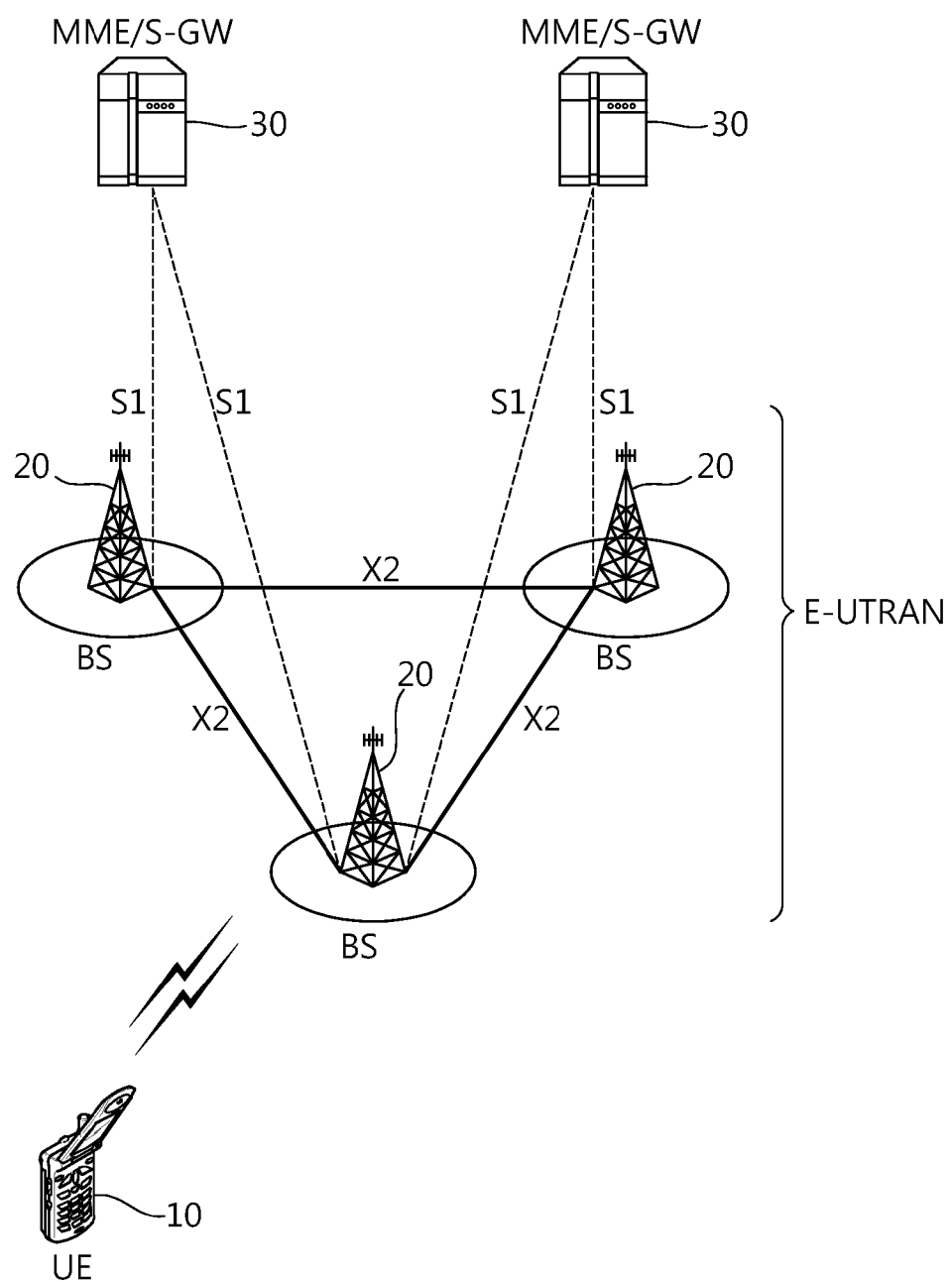
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
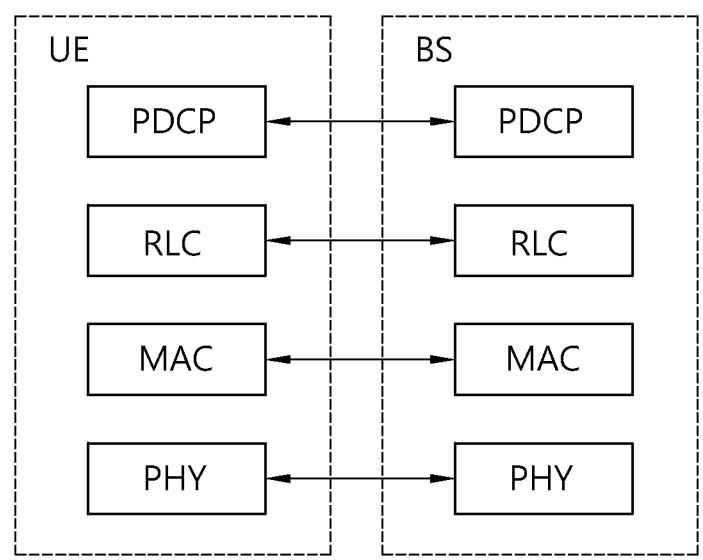
FIG. 2 is a block diagram illustrating a radio protocol architecture for a user plane.
Figure 3:
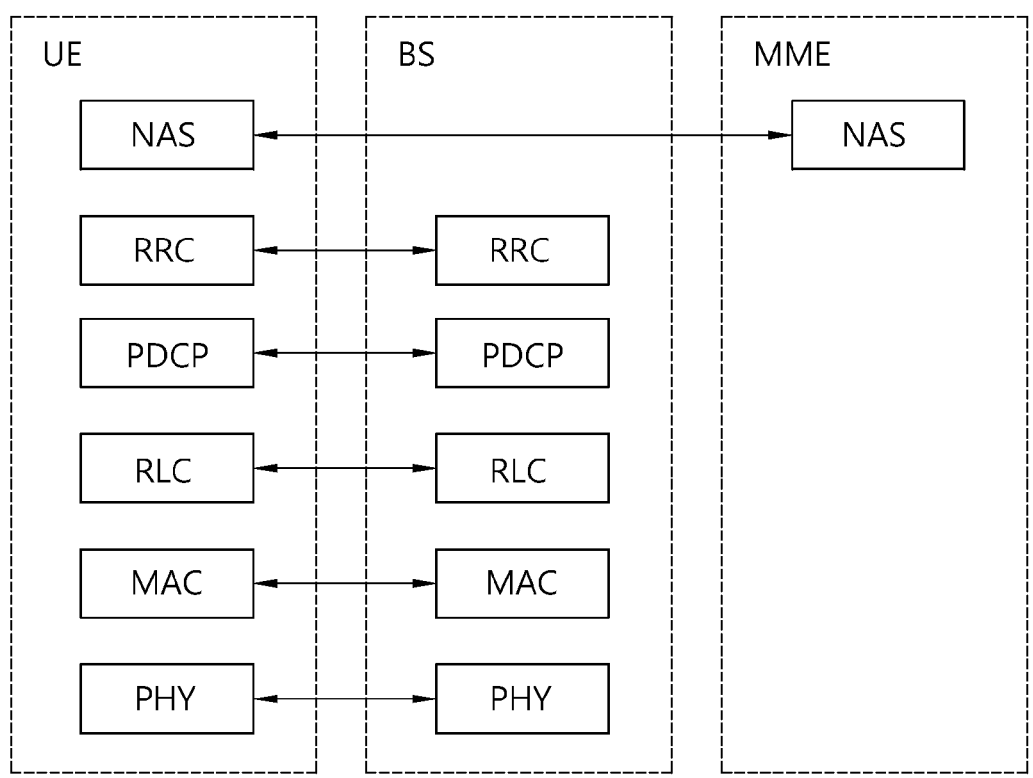
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

As disclosed in 3GPP TS 36.211 V8.7.0, a physical channel in 3GPP LTE may be divided into the physical downlink shared channel (PDSCH) and a physical uplink shared channel (PUSCH) which are data channels, and a physical downlink control channel PDCCH), a physical control format indicator channel (PCFICH), a physical hybrid-ARQ indicator channel (PHICH), and a physical uplink control channel (PUCCH) which are control channels.

The PCFICH transmitted in a first OFDM symbol of the subframe transports a control format indicator (CFI) regarding the number (that is, the size of the control region) of OFDM symbols used to transmit control channels in the subframe. The terminal first receives the CFI on the PCFICH and thereafter, monitors the PDCCH.

The PDCCH as a downlink control channel is also referred to as a scheduling channel in terms of transporting scheduling information. Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE, the terminal uses blind decoding in order to detect the PDCCH. The blind decoding is a scheme that checks a CRC error by demasking a desired identifier to a CRC of a received PDCCH (referred to as a PDCCH candidate) to check whether the corresponding PDCCH is a control channel thereof.

The base station determines a PDCCH format according to a DCI to be transmitted to the terminal and then adds a cyclic redundancy check (CRC) to the DCI, and masks a unique identifier (referred to as a radio network temporary identifier (RNTI)) to the CRC according to an owner or a usage of the PDCCH.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection state operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle state: It needs to be guaranteed that the terminal has valid versions of the MIB and the SIB1 as well as the SIB2 to SIB8 and this may be followed by supporting a considered RAT.

In the case where the terminal is in an RRC connection state: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
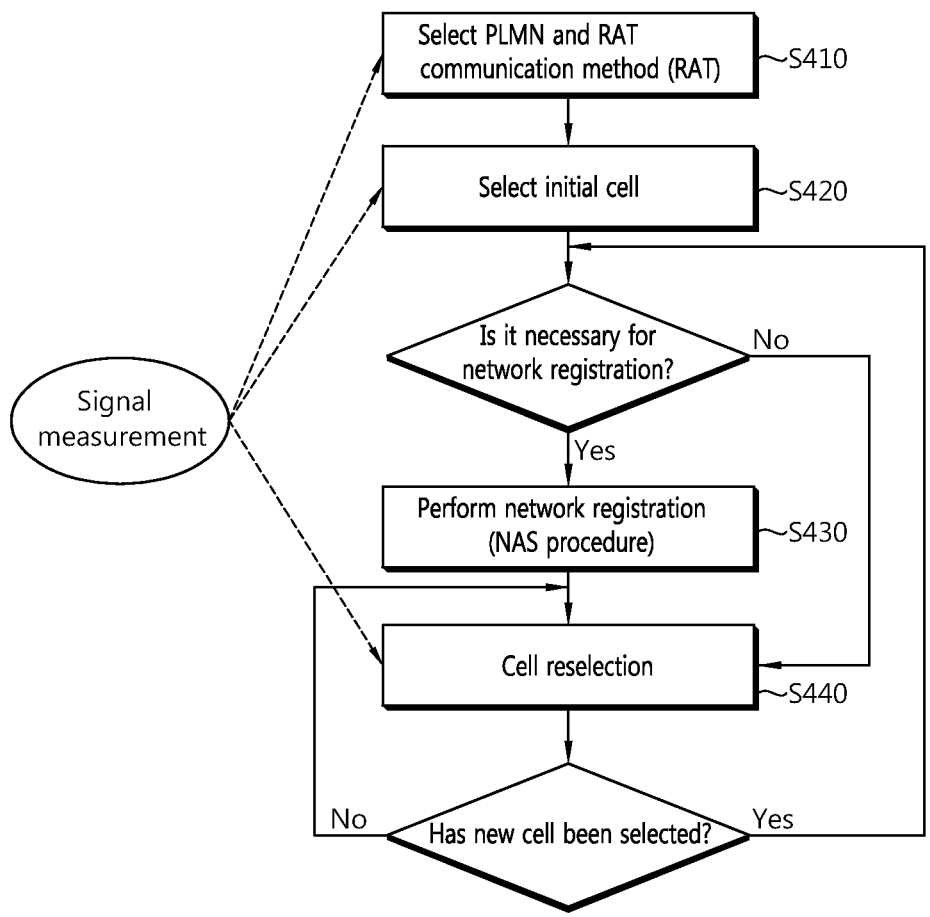
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
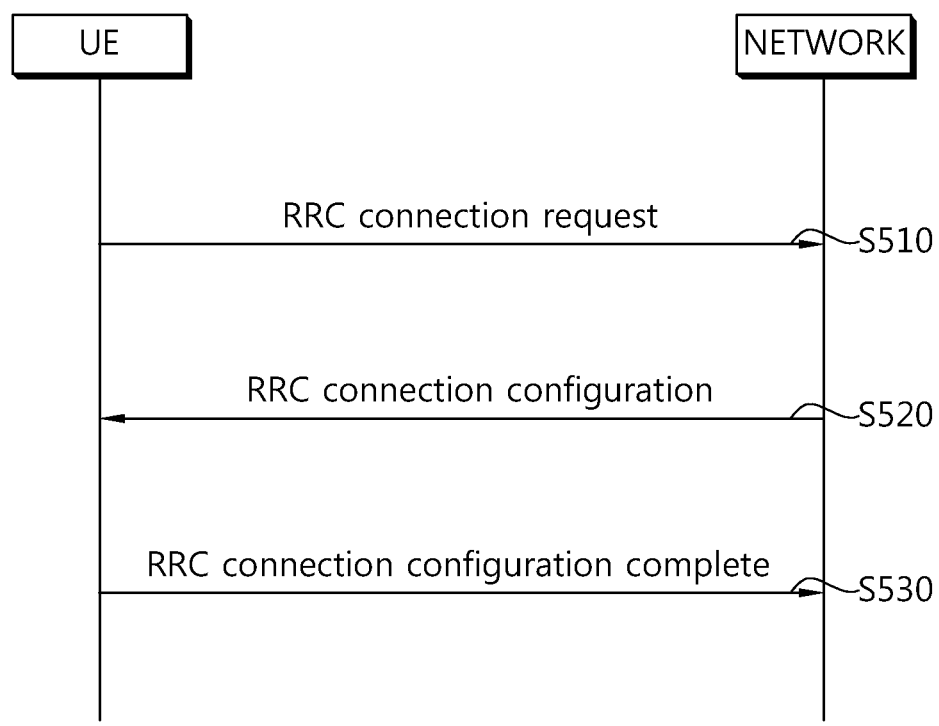
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
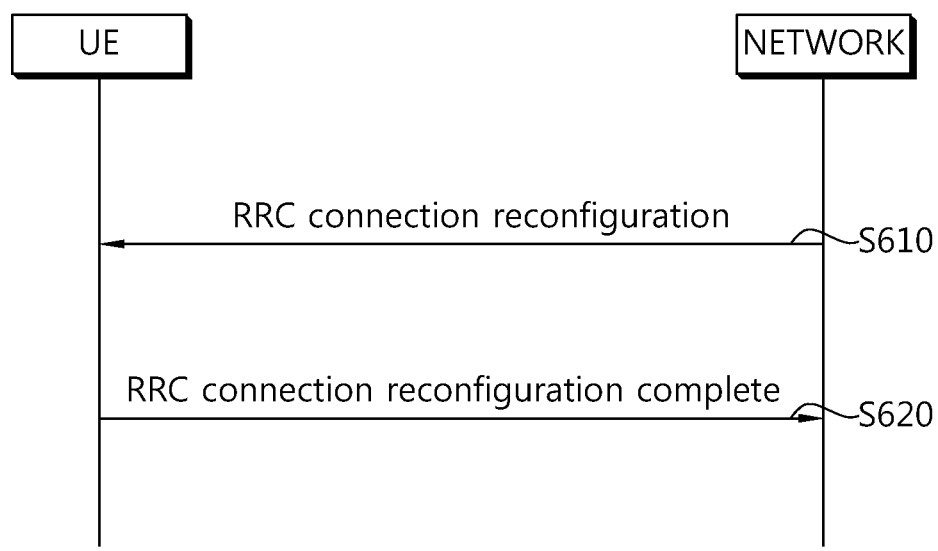
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

A cell selection criterion may be defined as shown in Equation 1 given below.

$$\text{Srxlev} > 0 \text{ AND } \text{Squal} > 0 \quad \text{[Equation 1]}$$

where:
Srxlev=$Q_{rxlevmeas}$−($Q_{rxlevmin}$+$Q_{rxlevminoffset}$)−Pcompensation Squal=$Q_{qualmeas}$−($Q_{qualmin}$+$Q_{qualminoffset}$)

Herein, each variable of Equation 1 may be defined as shown in Table 1 given below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | max($P_{EMAX}$ − $P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$ which are signaled values as a result of a periodic search for a PLMN having a higher priority while the terminal camps on a normal cell may be applied only when cell selection is evaluated. During the periodic search for the PLMN having the higher priority, the terminal may perform the cell selection evaluation by using parameter values stored from another cell of the PLMN having the higher priority.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, \quad R_n = Q_{meas,n} - Q_{offset} \quad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

When the terminal perform cell reselection according to the cell reselection evaluation, the terminal may decide that a cell reselection criterion is satisfied when the cell reselection criterion is satisfied for a specific time and move the cell to the selected target cell. Herein, the specific time may be given from the network as a Treselection parameter. The Treselection may specify a cell reselection timer value and be defined with respect to each frequency and another RAT of the E-UTRAN.

Hereinafter, cell reselection information used for the cell reselection by the terminal will be described.

The cell reselection information may be transmitted while being included in the system information broadcasted from the network in a format of the cell reselection parameter and provided to the terminal. The cell reselection parameter provided to the terminal may include the following types.

Cell Reselection Priority: The cellReselectionPriority parameter specifies the priority of a frequency of the E-UTRAN, a frequency of the UTRAN, a group of GERAN frequencies, a band class of CDMA2000 HRPD, or a band class of CDMA2000 1×RTT.

$Qoffset_{s,n}$: Specifies an offset value between two cells.

$Qoffset_{frequency}$: Specifies a frequency specific offset for the E-UTRAN having the same priority.

$Q_{hyst}$: Specifies a hysteresis value for a rank index.

$Q_{qualmin}$: Specifies a minimally required quality level and specified by the unit of dB.

$Q_{rxlevmin}$: Specifies a minimally required Rx level and specified by the unit of dB.

$Treselection_{EUTRA}$: Specifies the cell reselection timer value for the E-UTRAN and may be configured with respect to each frequency of the E-UTRAN.

$Treselection_{UTRAN}$: Specifies the cell reselection timer value for the UTRAN.

$Treselection_{GERA}$: Specifies the cell reselection timer value for the GERAN.

$Treselection_{CDMA\_HRPD}$: Specifies the cell reselection timer value for the CDMA HRPD.

$Treselection_{CDMA\_1xRTT}$: Specifies the cell reselection timer value for the CDMA 1×RTT.

$Thresh_{x,HighP}$: An Srxlev threshold value used by the terminal when reselection to an RAT/frequency having a higher priority than a serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

$Thresh_{x,HighQ}$: An Squal threshold value used by the terminal when reselection to the RAT/frequency having the higher priority than the serving frequency is specified by the unit of dB. Specific threshold values may be individually configured with respect to each frequency of the E-TRAUN and the UTRAN FDD.

$Thresh_{x,LowP}$: The Srxlev threshold value used by the terminal when reselection to an RAT/frequency having a lower priority than the serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

$Thresh_{x,LowQ}$: The Squal threshold value used by the terminal when reselection to the RAT/frequency having the lower priority than the serving frequency is specified by the unit of dB. Specific threshold values may be individually configured with respect to each frequency of the E-TRAUN and the UTRAN FDD.

$Thresh_{serving, LowP}$: The Srxlev threshold value used by the terminal on the serving cell when reselection to the lower RAT/frequency is specified by the unit of dB.

$Thresh_{serving, LowQ}$: The Squal threshold value used by the terminal on the serving cell when reselection to the lower RAT/frequency is specified by the unit of dB.

$S_{IntraSerachP}$: An Srxlev threshold value for intra-frequency measurement is specified by the unit of dB.

$S_{IntraSerachQ}$: An Squal threshold value for intra-frequency measurement is specified by the unit of dB.

$S_{nonIntraSerachP}$: An Srxleve threshold value for E-UTRAN intra-frequency and inter-RAT measurement are specified by the unit of dB.

$S_{nonIntraSemehQ}$: An Squal threshold value for E-UTRAN intra-frequency and inter-RAT measurement are specified by the unit of dB.

Meanwhile, the aforementioned cell reselection parameter may be scaled according to mobility of the terminal. The mobility of the terminal may be estimated based on the number of times when the terminal moves through cell reselection and/or handover during a specific time interval and this is referred to as mobility state estimation (MSE). The mobility of the terminal may be estimated as one of a normal mobility state, a medium mobility state, and a high mobility state according to the MSE.

A parameter which may be used as a reference for estimating the mobility state of the terminal in the MSE may be provided. $T_{CRmax}$ specifies a specific time interval for counting moving execution of another terminal $N_{CR\_H}$ indicates the maximum number of times of cell reselection for entering the high mobility. $N_{CR\_M}$ indicates the maximum number of times of cell reselection for entering the medium mobility. $T_{CRmaxHyst}$ specifies an additional time interval before the terminal may enter the general mobility state.

A terminal that is in an RRC_IDLE state performs the cell reselection when a cell reselection condition is satisfied. When the number of times at which the terminal performs the cell reselection for $T_{CRmax}$ is more than $N_{CR\_H}$ which is a first threshold value, a condition of the high mobility state is satisfied as the mobility state of the terminal. When the number of times at which the terminal performs the cell reselection for $T_{CRmax}$ is more than $N_{CR\_M}$ which is a second threshold value and not more than $N_{CR\_H}$ which is the first threshold value, a condition of the medium mobility state is satisfied as the mobility state of the terminal. When the number of times when the terminal performs the cell reselection for $T_{CRmax}$ is not more than $N_{CR\_M}$ which is the second threshold value, a condition of the normal mobility state is satisfied as the mobility state of the terminal. For example, when it is not sensed that the terminal is in the high mobility state and the normal mobility state during an additional time interval $T_{CRmaxHyst}$, it may be estimated that the terminal is in the normal mobility state. However, when the terminal performs the cell reselection consecutively between two same cells, the cell reselection may not be counted as the number of cell reselection times.

A scaling factor may be specified according to the mobility state of the terminal according to the MSE and the scaling factor may be applied to one or more cell reselection parameters. For example, sf-Medium and sf-High which are scaling factors according to the medium mobility and the high mobility may be applied to Qhyst, $Treselection_{EUTRA}$, $Treselection_{UTRA}$, $Treselection_{GERA}$, $Treselection_{CDMA\_HRPD}$, and $Treselection_{CDMA\_1xRTT}$.

Meanwhile, the cell reselection information may be provided to the terminal while being included in an RRC disconnection message which is an RRC message for RRC disconnection between the network and the terminal. For example, the RRC disconnection message may include a subcarrier frequency list and the cell reselection priority of the E-UTRAN, a subcarrier frequency list and the cell reselection priority of the UTRA-FDD, a subcarrier frequency list and the cell reselection priority of the UTRA-TDD, a subcarrier frequency list and the cell reselection priority of the GERAN, the band class list and the cell reselection priority of the CDMA2000 HRPD, and the band class list and the cell reselection priority of the CDMA2000 1×RTT.

Hereinafter, sharing an RAN by multiple operators will be described.

The multiple operators may provide the service by individually constructing the RAN, but provide the service to a subscriber by sharing a cell constructed by a specific operator. This is referred to as RAN sharing. In this case, the cell shared by the multiple providers may broadcast a PLMN list. The PLMN list may be transmitted while being included in SIB1 of the system information broadcasted by the cell. Meanwhile, a PLMN identifier first listed in the PLMN list included in the SIB1 may be implemented to indicate a primary PLMN.

Under a situation in which one cell is shared by the multiple operators, the cell reselection information provided by the shared cell may be commonly applied to all PLMNs in the PLMN list. In general, the cell reselection information provided by the shared cell is configured to primarily coincide with a policy of the primary PLMN. Therefore, terminals receiving a service depending on a secondary PLMN perform the cell reselection based on information other than the cell reselection information optimized for providing the service.

Hereinafter, the handover related with movement of the terminal in the RRC connection state will be described.

Figure 7:
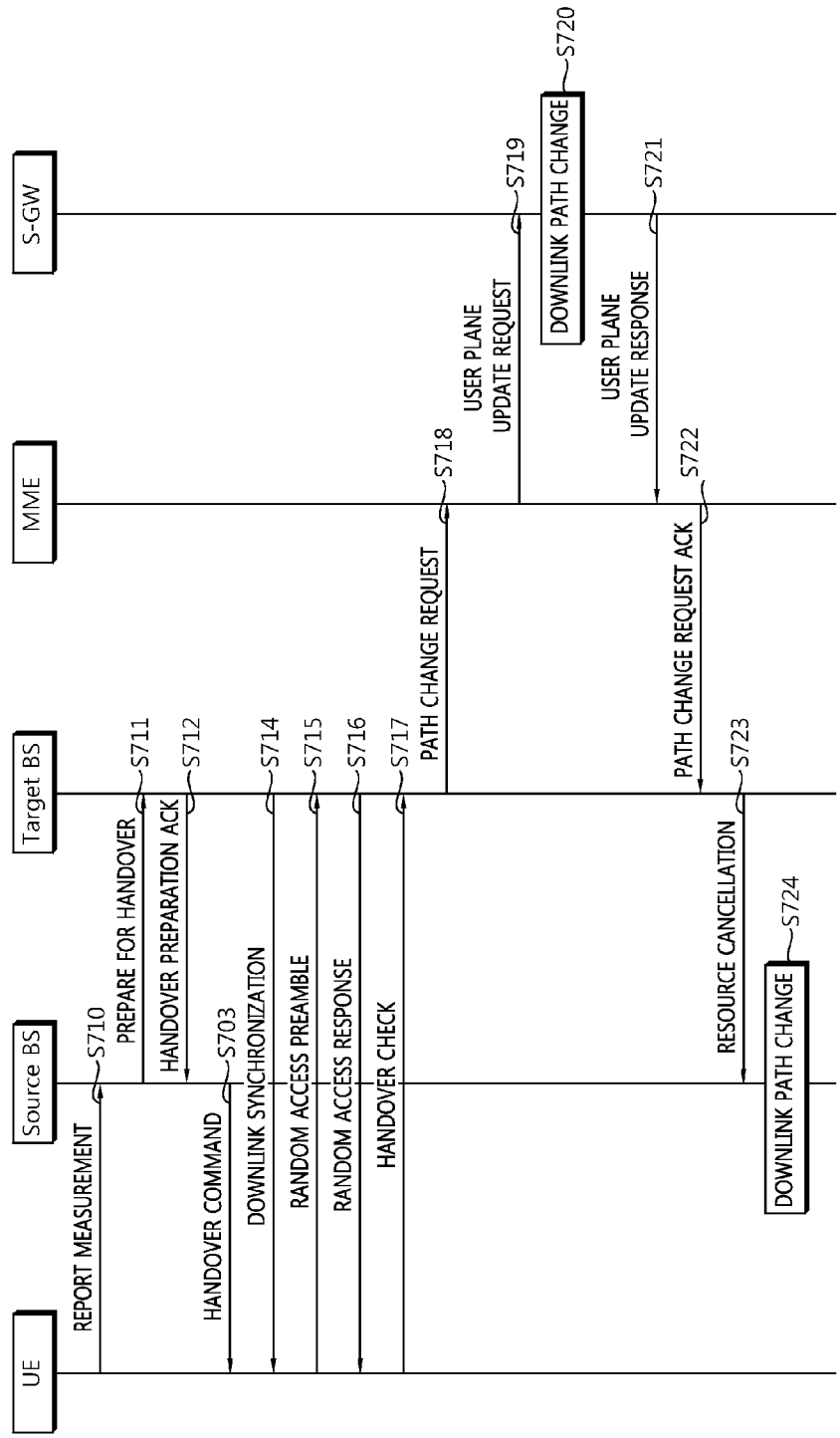
FIG. 7 is a flowchart illustrating a handover process.

FIG. 7 is a flowchart illustrating a handover process.

The terminal (UE) transmits a measurement report to a source base station (BS) (S710). The source base station decides whether to perform the handover by using the received measurement report. When the source base station decides the handover to a contiguous cell, the continuous cell becomes a target cell and a base station that belongs to the target cell becomes a target base station (BS).

The source base station transmits a handover preparation message to the target base station (S711). The target base station performs admission control in order to increase a success possibility of the handover.

The target base station transmits a handover preparation acknowledgement (ACK) message to the source base station (S712). The handover preparation acknowledgement (ACK) message may include a cell-radio network temporary identifier (C-RNTI) and/or a dedicated random access preamble. The C-RNTI is an identifier for identifying the terminal in the cell. The dedicated random access preamble as a preamble which the terminal may exclusively use during a predetermined period is used in performing the non-contention based random access. The random access process may be divided into a contention based random access process using the predetermined random access preamble and the non-contention based random access process using the dedicated random access preamble. The non-contention based random access process may prevent a delay of the handover due to contention with other terminals as compared with the contention based random access process.

The source base station transmits a handover command message to the terminal (S713). The handover command message may be transmitted in a form of a radio resource control (RRC) connection reconfiguration message. The handover command message may include the C-RNTI and the dedicated random access preamble received from the target base station.

The terminal receives the handover command message from the source base station and thereafter, synchronizes with the target base station (S714). The terminal receives a PSS and an SSS of the target base station to synchronize the PSS and the SS and receives the PBCH to acquire the system information.

The terminal transmits the random access preamble to the target base station to start the random access process (S715). The terminal may use the dedicated random access preamble included in the handover command message. Alternatively, if the dedicated random access preamble is not allocated, the terminal may use a predetermined random access preamble selected in a random access preamble set.

The target base station transmits a random access response message to the terminal (S716). The random access response message may include uplink resource allocation and/or time offset (timing advance).

The terminal that receives the random access response message adjusts uplink synchronization based on the time offset and transmits a handover confirm message to the target base station by using the uplink resource allocation (S717). The handover confirm message may indicate that the handover process is completed and be transmitted together with an uplink buffer status report.

The target base station transmits a path switch request message to a mobility management entity (MME).

The MME transmits a user plane update request message to a serving-gateway (S-GW) (S719).

The S-GW switches a downlink data path to the target base station (S720).

The S-GW transmits a user plane update response message to the MME (S721).

The MME transmits a path switch request ACK message to the target base station (S722).

The target base station transmits a resource release message to the source base station to notify the success of the handover (S723).

The source base station release a resource related to the terminal (S724).

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
  a case where the UE determines that there is a serious problem in the downlink communication link quality based on the radio quality measuring result of the PHY layer (determines that the quality of the PCell is low during the RLM.
  a case where the UE determines that there is a problem in the uplink transmission when a random access procedure is continuously failed in a MAC sub-layer.
  a case where the UE determines that there is a problem in the uplink transmission when uplink data transmission is continuously failed in an RLC sub-layer.
  a case where the UE determines that the handover is failed.
  a case where a massage received by the UE does not pass through an integrity check.

Hereinafter, the RRC connection re-establishment procedure will be described in more detail.

Figure 8:
FIG. 8 is a flowchart illustrating an RRC connection reconfiguration process.

FIG. 8 is a diagram illustrating a RRC connection re-establishment procedure.

Referring to FIG. 8, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S820). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S830). When it is determined that the selected cell is the suitable E-UTRAN cell, the UE transmits an RRC connection reestablishment request message to the corresponding cell (S840).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S850).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S860).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, interworking between the 3GPP based access network and another access network will be described.

In the 3GPP, access network discovery and selection functions (ANDSF) for discovering and selecting an accessible access network while introducing interworking with a non-3GPP access network (e.g., WLAN) from Rel-8 is standardized. The ANDSF may transfer access network discovery information (e.g., WLAN, WiMAX positional information, and the like) which is accessible at a location of the terminal, inter-system mobility policies (ISMP) to reflect a policy of a provider, and an inter-system routing policy (ISRP) and the terminal may determine IP traffic to be transmitted and an access network to be passed through based on the information. The ISMP may include a network selection rule regarding that the terminal selects one active access network connection (for example, WLAN or 3GPP). The ISRP may include a network selection rule regarding that the terminal selects one or more potential active access network connections (for example, both WLAN or 3GPP). The inter-system routing policy includes multiple access PDN connectivity (MAPCON), IP flow mobility (IFOM), and non-seamless WLAN offloading. Open mobile alliance device management, or the like is used for dynamic provision between the ANDSF and the terminal.

The MAPCON is configured by standardizing a technology that configures and maintains simultaneous multiple PDN connectivity via the 3GPP access network and the non-3GPP access network and enables seamless traffic offloading whole active PDN connection unit seamless traffic offloading. To this end, an ANDSF server provides information on an access point name (APN) that will perform offloading, a priority (routing rule) between the access networks, a time (time of day) to which an offloading method is applied, and information on an access network (validity area) to be offloaded.

The IFOM supports more flexible and subdivided IP flow mobility and seamless offloading than the MAPCON. A technical feature of the IFOM enables the terminal to access the packet data network through different access networks even when being connected to the packet data network by using the same access point name (APN) and enables the mobility and offloading units to move to not the packet data network (PDN) but a specific service IP traffic flow unit to acquire flexibility in service providing. To this end, the ANDSF server provides information on an IP flow that will perform the offloading, the priority (routing rule) between the access networks, the time (time of day) to which the offloading method is applied, and the information on the access network (validity area) to be offloaded.

Non-seamless WLAN offloading represents a technology that does not change a path of predetermined specific IP traffic to the WLAN but completely offloads traffic so as not to pass through an EPC. Since this is not anchored to a P-GW for supporting the mobility, the offloaded IP traffic may not seamlessly to the 3GPP access network again. To this end, the ANDSF server provides information similar to information provided to perform the IFOM to the terminal.

Figure 9:
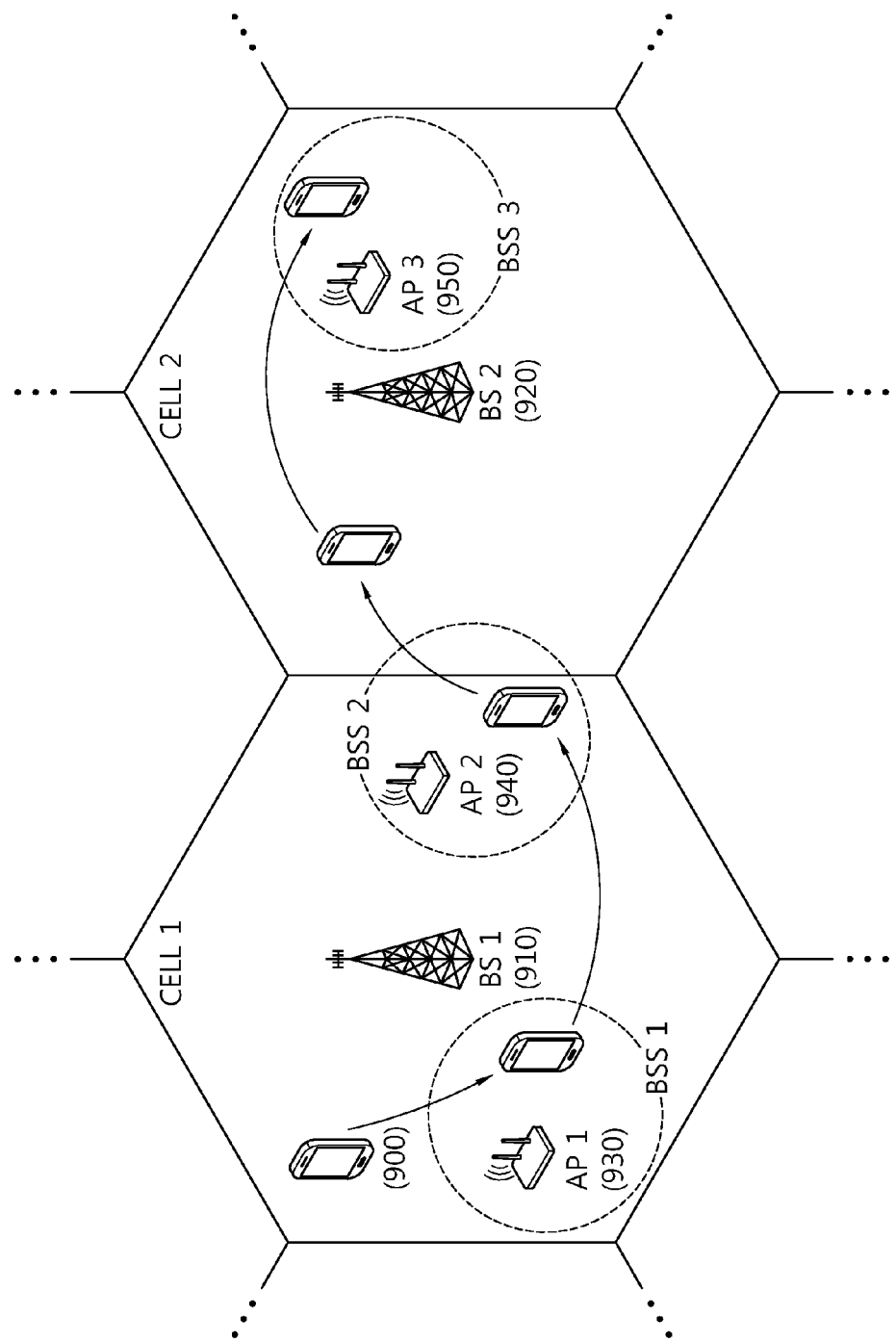
FIG. 9 is a diagram illustrating an example of an environment in which the 3GPP access network and the WLAN access network coexist.

FIG. 9 is a diagram illustrating an example of an environment in which the 3GPP access network and the WLAN access network coexist.

Referring to FIG. 9, as the 3GPP access network, cell 1 in which base station 1 910 is centered and cell 2 in which base station 2 920 is centered are extended. Further, as the WLAN access network, basic service set (BSS) 1 in which an access point (AP)1 930 positioned in the cell 1 is centered and BSS2 in which an AP2 940 is centered are extended and BSS3 in which AP3 950 that exists in cell 2 is centered are extended. Coverage of the cell is illustrated by a solid line and coverage of the BSS is illustrated by dotted lines.

It is assumed that a terminal 900 is configured to perform communication through the 3GPP access network and the WLAN access network. In this case, the terminal 900 may be called a station.

Initially, the terminal 900 establishes connection with the BS1 910 in the cell 1 to perform traffic processing through the 3GPP access network.

The terminal 900 may enter coverage of the BSS1 while moving in coverage of cell 1 and discover the BSS1 through scanning. In this case, the terminal 900 may be connected with the WLAN access network by performing association and authentication procedures with the AP1 930 of the BSS1. As a result, the terminal 900 may process the traffic through the 3GPP access network and the WLAN access network. Meanwhile, when the terminal 900 moves to deviate from the coverage of the BSS1, connection with the WLAN access network may end.

The terminal 900 continuously moves in the coverage of the cell 1 to move to the vicinity of a boundary between the cell 1 and the cell 2 and enters the coverage of the BSS2 to discover the BSS2 through scanning. In this case, the terminal 900 may be connected with the WLAN access network by performing the association and authentication procedures with the AP2 940 of the BSS2. Meanwhile, since the terminal 900 in the coverage of the BSS2 is positioned on the boundary of the cell 1 and the cell 2, service quality through the 3GPP access network may not be excellent. In this case, the terminal 900 may operate to concentratively process the traffic through the WLAN access network.

When the terminal 900 moves to deviate from the coverage of the BSS2 and enters the center of the cell 2, the terminal 900 may terminate the connection with the WLAN access network and process the traffic through the 3GPP access network based on the cell 2.

The terminal 900 may enter the coverage of the BSS3 while moving in the coverage of cell 2 and discover the BSS1 through scanning. In this case, the terminal 900 may be connected with the WLAN access network by performing the association and authentication procedures with the AP3 950 of the BSS3. As a result, the terminal 900 may process the traffic through the 3GPP access network and the WLAN access network.

As described in the example of FIG. 9, under a wireless communication environment in which the 3GPP access network and the non-3GPP access network coexist, the terminal may adaptively process the traffic through the 3GPP access network and/or the non-3GPP access network.

One of primary objects of performing interworking is to control the load of the access network by offloading the traffic. To this end, the base station may move some terminals among terminals which establish the RRC connection to another access network according to a load level of the CN. Therefore, the base station may decide a load control level of the network and easily control the load.

Meanwhile, in the interworking between the 3GPP access network and the non-3GPP access network in the related art, the terminal selects a specific access network according to the ANDSF policy and processes the traffic through the selected access network. In this case, the base station may not control the interworking between the 3GPP access network and the non-3GPP access network. Further, a terminal that may not support the traffic processing according to the ANDSF policy may not perform efficient traffic processing through the interworking between the networks. Therefore, the radio resource is not normally allocated to terminals that receive the service in the cell to cause a problem in that the quality of service (QoS) of the terminals deteriorates.

A traffic routing criterion needs to be provided to the terminal in order for the terminal to process the traffic through the non-3GPP access network appropriate to traffic routing. Further, the base station needs to acquire information on the non-3GPP access network around the terminal and determine whether the traffic processing through the non-3GPP access network is appropriate in order to control the interworking between the access networks.

By such a point, the present invention proposes a scheme in which the base station configures the traffic routing criterion for the traffic routing to the non-3GPP access network for the terminal. The terminal may discover the appropriate nont-3GPP access network by evaluating the traffic routing criterion, and route and process the 3GPP traffic.

Hereinafter, in describing the communication method that provides configuring the traffic routing criterion to the terminal, it will be described that the non-3GPP access network is the WLAN access network as an example. However, the scope of the present invention is not limited thereto and may be applied even to communication of the terminal associated with other access networks.

Figure 10:
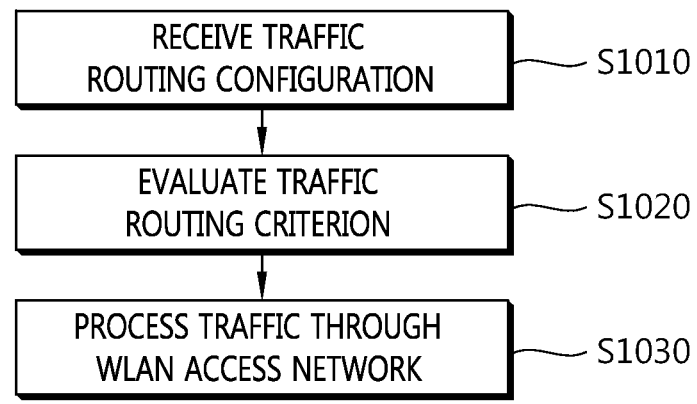
FIG. 10 is a diagram illustrating a communication method according to a first embodiment of the present invention.

FIG. 10 is a diagram illustrating a communication method according to a first embodiment of the present invention.

Referring to FIG. 10, the terminal receives a traffic routing configuration (S1010). The traffic routing configuration may be transmitted from the 3GPP access network.

The traffic routing configuration may be provided to the terminal through broadcast signaling from the 3GPP access network. For example, the traffic routing configuration may be transmitted while being included in the system information broadcasted by the 3GPP access network.

The traffic routing configuration may be provided to the terminal through dedicated signaling from the 3GPP access network. For example, the traffic routing configuration may be transmitted while being included in the RRC message.

The traffic routing configuration may specific the traffic routing criterion. The terminal may decide whether a specific WLAN access network is appropriate to processing the 3GPP traffic through the traffic routing criterion. To this end, the traffic routing configuration may include a report event and a concerned WLAN list.

The traffic routing configuration may include at least one or more routing events. Each routing event may define a routing condition used when the terminal determines whether a specific WLAN access network entity is appropriate to processing the 3GPP traffic. The routing event which may be configured in the terminal may be defined as follows and one or more routing events may be configured in the terminal.

1) Events related with signal quality of WLAN access network

The signal quality of the concerned WLAN is lower than $Q_{T,WLAN,1}$

The signal quality of the concerned WLAN is equal to or lower than $Q_{T,WLAN,1}$ The signal quality of the concerned WLAN is lower than $Q_{T,WLAN,1}$ by a specific offset The signal quality of the concerned WLAN is equal to or lower than a value acquired by applying the specific offset to $Q_{T,WLAN,1}$ by the offset The signal quality of the concerned WLAN is higher than $Q_{T,WLAN,2}$ The signal quality of the concerned WLAN is equal to or higher than $Q_{T,WLAN,2}$ The signal quality of the concerned WLAN is higher than $Q_{T,WLAN,2}$ by a specific offset The signal quality of the concerned WLAN is equal to or higher than a value acquired by applying the specific offset to $Q_{T,WLAN,2}$ by the offset The signal quality of the concerned WLAN is lower than $Q_{T,WLAN,1}$ and higher than $Q_{T,WLAN,2}$ The signal quality of the concerned WLAN is equal to or lower than $Q_{T,WLAN,1}$ and equal to or higher than $Q_{T,WLAN,2}$ The signal quality of the concerned WLAN is lower than $Q_{T,WLAN,1}$ by the specific offset and higher than $Q_{T,WLAN,2}$ by the specific offset The signal quality of the concerned WLAN is equal to or lower than the value acquired by applying the specific offset to $Q_{T,WLAN,1}$ by the offset and equal to or higher than the value acquired by applying the specific offset to $Q_{T,WLAN,2}$ by the offset ($Q_{T,WLAN,1}$ and $Q_{T,WLAN,2}$ as specific quality threshold values may have the same value as each other or different values from each other.)

2) Events related with load of WLAN access network

The load of the concerned WLAN is lower than $L_{T,WLAN,1}$

The load of the concerned WLAN is equal to or lower than $L_{T,WLAN,1}$

The load of the concerned WLAN is lower than $L_{T,WLAN,1}$ by a specific offset The load of the concerned WLAN is equal to or lower than a value acquired by applying the specific offset to $L_{T,WLAN,1}$ by the offset The load of the concerned WLAN is higher than $L_{T,WLAN,2}$ The load of the concerned WLAN is equal to or higher than $L_{T,WLAN,2}$ The load of the concerned WLAN is higher than $L_{T,WLAN,2}$ by the specific offset The load of the concerned WLAN is equal to or lower than a value acquired by applying the specific offset to $L_{T,WLAN,2}$ by the offset The load of the concerned WLAN is lower than $L_{T,WLAN,1}$ and higher than $L_{T,WLAN,2}$ The load of the concerned WLAN is equal to or lower than $L_{T,WLAN,1}$ and equal to or higher than $L_{T,WLAN,2}$ The load of the concerned WLAN is lower than $L_{T,WLAN,1}$ by the specific offset and higher than $L_{T,WLAN,2}$ by the specific offset The load of the concerned WLAN is equal to or lower than the value acquired by applying the specific offset to $L_{T,WLAN,1}$ by the offset and equal to or higher than the value acquired by applying the specific offset to $L_{T,WLAN,2}$ by the offset (($L_{T,WLAN,1}$ and $L_{T,WLAN,2}$ as specific quality threshold values may have the same value as each other or different values from each other.)

3) Events related with signal quality of 3GPP access network

The signal quality of the current 3GPP access network is lower than $Q_{T,3GPP,1}$ The signal quality of the current 3GPP access network is equal to or lower than $Q_{T,3GPP,1}$ The signal quality of the current 3GPP access network is lower than $Q_{T,3GPP,1}$ by a specific offset The signal quality of the current 3GPP access network is equal to or lower than a value acquired by applying the specific offset value to $Q_{T,3GPP,1}$ by the specific offset The signal quality of the current 3GPP access network is higher than $Q_{T,3GPP,2}$ The signal quality of the current 3GPP access network is equal to or higher than $Q_{T,3GPP,2}$ The signal quality of the current 3GPP access network is higher than $Q_{T,3GPP,2}$ by a specific offset The signal quality of the current 3GPP access network is equal to or higher than a value acquired by applying the specific offset value to $Q_{T,3GPP,2}$ by the specific offset The signal quality of the current 3GPP access network is lower than $Q_{T,3GPP,1}$ and higher than $Q_{T,3GPP,2}$ The signal quality of the current 3GPP access network is equal to or lower than $Q_{T,3GPP,1}$ and equal to or higher than $Q_{T,3GPP,2}$ The signal quality of the current 3GPP access network is lower than $Q_{T,3GPP,1}$ and higher than $Q_{T,3GPP,2}$ by the specific offset The signal quality of the current 3GPP access network is equal to or lower than the value acquired by applying the specific offset to $Q_{T,3GPP,1}$ by the offset and equal to or higher than the value acquired by applying the specific offset to $Q_{T,3GPP,2}$ by the offset ($Q_{T,3GPP,1}$ and $Q_{T,3GPP,2}$ as specific quality threshold values may have the same value as each other or different values from each other.)

4) Events related with load of 3GPP access network

The load of the current 3GPP access network is lower than $L_{T,3GPP,1}$

The load of the current 3GPP access network is equal to or lower than $L_{T,3GPP,1}$ The load of the current 3GPP access network is lower than $L_{T,3GPP,1}$ by a specific offset The load of the current 3GPP access network is equal to or lower than a value acquired by applying the specific offset value to $L_{T,3GPP,1}$ by the specific offset The load of the current 3GPP access network is higher than $L_{T,3GPP,2}$ The load of the current 3GPP access network is equal to or higher than $L_{T,3GPP,2}$ The load of the current 3GPP access network is higher than $L_{T,3GPP,2}$ by a specific offset The load of the current 3GPP access network is equal to or higher than a value acquired by applying the specific offset value to $L_{T,3GPP,2}$ by the specific offset The load of the current 3GPP access network is lower than $L_{T,3GPP,1}$ and higher than $L_{T,3GPP,2}$ The load of the current 3GPP access network is equal to or lower than $L_{T,3GPP,1}$ and equal to or higher than $L_{T,3GPP,2}$ The load of the current 3GPP access network is lower than $L_{T,3GPP,1}$ by the specific offset and higher than $L_{T,3GPP,2}$ by the specific offset The load of the current 3GPP access network is equal to or lower than the value acquired by applying the specific offset to $L_{T,3GPP,1}$ by the offset and equal to or higher than the value acquired by applying the specific offset to $L_{T,3GPP,2}$ by the specific offset ($L_{T,WLAN,1}$ and $L_{T,WLAN,2}$ as specific quality threshold values may have the same value as each other or different values from each other.)

Meanwhile, the routing event may be configured by one or more events.

The traffic routing configuration may include a concerned WLAN list for specifying a target WLAN access network for evaluating the traffic routing criterion. The concerned WLAN may be a WLAN access network entity in which processing the 3GPP traffic is permitted. The concerned WLAN may be a WLAN access network entity in which the terminal is permitted to process the traffic on the 3GPP access network and to which the routing event of the traffic routing configuration may be applied. The concerned WLAN list may include identifiers of the WLAN access network entity described below.

WLAN SSID (Service Set Identifier): The SSID may be duplicatively used in a plurality of BSSs.

WLAN BSSID (Basic Service Set Identifier): The BSSID as information for identifying a BSS managed by a specific AP may be generally set as an MAC address of the corresponding AP.

HESSID (Homogeneous Extended Service Set Identifier): The HESSID as the same value as one BSSID among APs and an identifier set by a hotspot operator may be set in the form of the MAC address. All APs in a hotspot network may be set the same HESSID value.

Domain name list: The domain name list may include one or more domain names of the WLAN access network entity.

The traffic routing configuration includes information which makes the concerned WLAN and the routing event to be correlated to each other, and as a result, the routing event which may be applied to the specific concerned WLAN may be specified. A plurality of concerned WLAN may be correlated to the same routing event. Further, a plurality of routing events may be correlated to one concerned WLAN.

Implementation of the correlation of the concerned WLAN and the routing event may be described with reference to FIG. 11.

Figure 11:
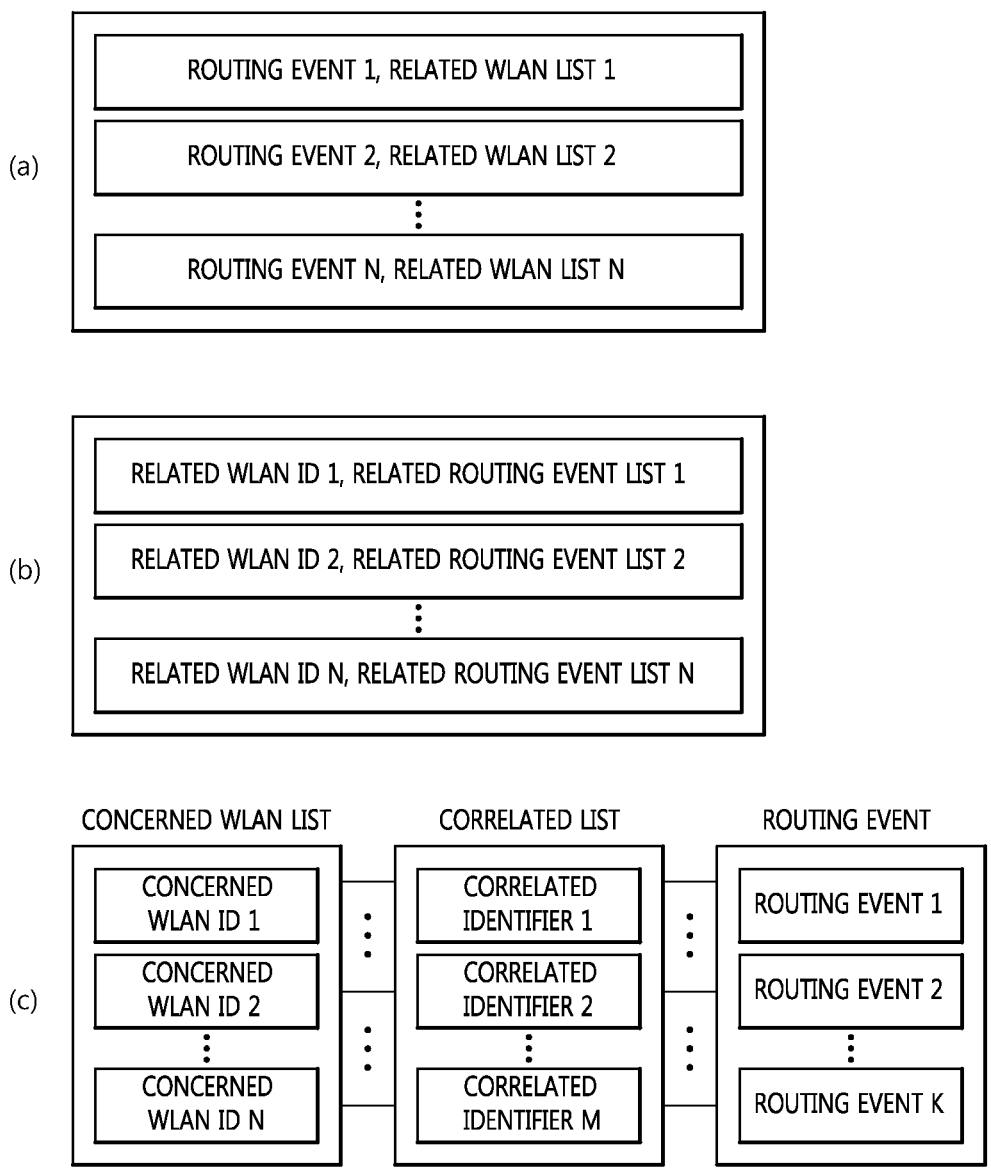
FIG. 11 is a diagram illustrating one example of the correlation of the concerned WLAN and the routing event according to an embodiment of the present invention.

FIG. 11 is a diagram illustrating one example of the correlation of the concerned WLAN and the routing event according to an embodiment of the present invention.

A sub figure (a) of FIG. 11 illustrates an example in which one or more concerned WLANs are correlated to one routing event. To this end, the routing event configuration information may include a related WLAN list and the corresponding list may include one or more concerned WLAN identifiers.

A sub figure (b) of FIG. 11 illustrates an example in which one or more routing events are correlated to one concerned WLAN. To this end, each concerned WLAN identification information of the concerned WLAN list may include a related routing event and the corresponding list may include one or more routing events.

A sub figure (c) of FIG. 11 illustrates an example in which a correlation between the concerned WLAN and the routing vent may be identified through a correlation identifier. The traffic routing configuration includes a correlation list and each correlation identifier of the correlation list identifies correlations between one or more concerned WLANs and one or more routing events. To this end, the correlation identifier may be implemented as WLAN ID(s) and routing event ID(s).

Referring back to FIG. 10, the terminal that receives the traffic routing configuration discovers the concerned WLAN. The concerned WLAN search may be an operation of discovering the concerned WLAN access network among the WLAN access entities that exist around the terminal. To this end, the terminal may perform scanning A scanning operation may be performed according to passive scanning and/or active scanning defined in the WLAN.

According to the passive scanning, the terminal may discover the WLAN access network entity through receiving a beacon frame transmitted from the WLAN access network entity. The terminal may discover an AP and/or a non-AP station that transmits the beacon frame. All or some of the WLAN system information are included in the beacon frame broadcasted from the AP and/or the non-AP station. In more detail, as identification information for the WLAN access network entity for the corresponding AP and/or the non-AP station, the BSSID, the SSID, the HESSID, and the like may be included in the beacon frame. Further, capability information which may be supported by the WLAN access network entity may be included in the beacon frame.

According to the active scanning, the terminal may transmit a probe request frame. The probe request frame may be transmitted in a broadcast scheme. The terminal may receive a probe response frame from a specific WLAN access network entity as a response to the probe request frame and discover the corresponding WLAN access network entity. The terminal may discover an AP and/or a non-AP station that transmits the probe response frame. All or some of the WLAN system information are included in the probe response frame transmitted from the AP and/or the non-AP station. In more detail, as the identification information for the WLAN access network entity for the corresponding AP and/or the non-AP station, the BSSID, the SSID, the HESSID, and the like may be included in the probe response frame. Further, the capability information which may be supported by the WLAN access network entity may be included in the probe response frame.

The terminal determines whether the WLAN access network entity is the concerned WLAN according to the traffic routing configuration. The terminal checks whether the identifier o the WLAN access network entity acquired through the scanning is included in the concerned WLAN list. When the identifier is included in the concerned WLAN list, the terminal may decide that the corresponding WLAN access network entity is the concerned WLAN. On the contrary, when the identifier is not included in the concerned WLAN list, the terminal may decide that the corresponding WLAN access network entity is not the concerned WLAN.

The terminal evaluates whether the discovered concerned WLAN satisfies the traffic routing criterion (S1020). The terminal decides whether the concerned WLAN satisfies the traffic routing criterion according to the routing event correlated with the concerned WLAN. When the traffic routing criterion is satisfied according to the routing event, the terminal may decide that the corresponding concerned WLAN is the WLAN access network entity appropriate to processing the 3GPP traffic. Therefore, the terminal may decide to process the 3GPP through the corresponding WLAN access network entity.

When the plurality of routing events is correlated to one concerned WLAN, the terminal may decide that the traffic routing criterion is satisfied when one of the plurality of routing events is satisfied. Alternatively, when the plurality of routing events is correlated to one concerned WLAN, the terminal may decide that the traffic routing criterion is satisfied when all of the plurality of routing events are satisfied.

When the traffic routing criterion according to the routing event is not satisfied, the terminal may continuously and periodically decide whether the corresponding concerned WLAN satisfies the traffic routing criterion. Further, simultaneously, another WLAN may be discovered by restarting the WLAN search and evaluating the traffic routing criterion according to the related routing event may be started.

The terminal may discover the plurality of concerned WLANs and evaluate whether the concerned WLANs satisfy the traffic routing criterion.

The terminal that determines that the discovered concerned WLAN satisfies the traffic routing criterion may access the corresponding WLAN access network entity and route and process the traffic to the WLAN access network (S1050). The terminal's access to the concerned WLAN access network entity may include performing the association and authentication procedures with the corresponding AP. The association procedure may be performed as the terminal transmits the association request frame to the WLAN access network entity and receives the association response frame from the AP as a response thereto. The authentication procedure may be performed through transmission/reception of an authentication frame between the WLAN access network entities.

Processing the traffic on the 3GPP through the 3GPP/WLAN access network may include processing some and/or all traffic through the 3GPP or WLAN access network. The terminal may process all traffic through the 3GPP access network or the WLAN access network. Alternatively, the terminal may process some traffic through the 3GPP access network and residual traffic through the WLAN access network.

In the embodiment of FIG. 10, the terminal starts the traffic processing through the WLAN access network when the traffic routing criterion is satisfied. Unlike this, the terminal may notify the information on the corresponding WLAN access network entity to the 3GPP access network when the traffic routing criterion is satisfied. In this case, the 3GPP access network (e.g., base station) that receives the WLAN information may additionally determine whether the traffic processing through the corresponding WLAN access entity is appropriate to thereby control the traffic processing of the terminal. An embodiment related therewith will be described with reference to FIG. 12.

Figure 12:
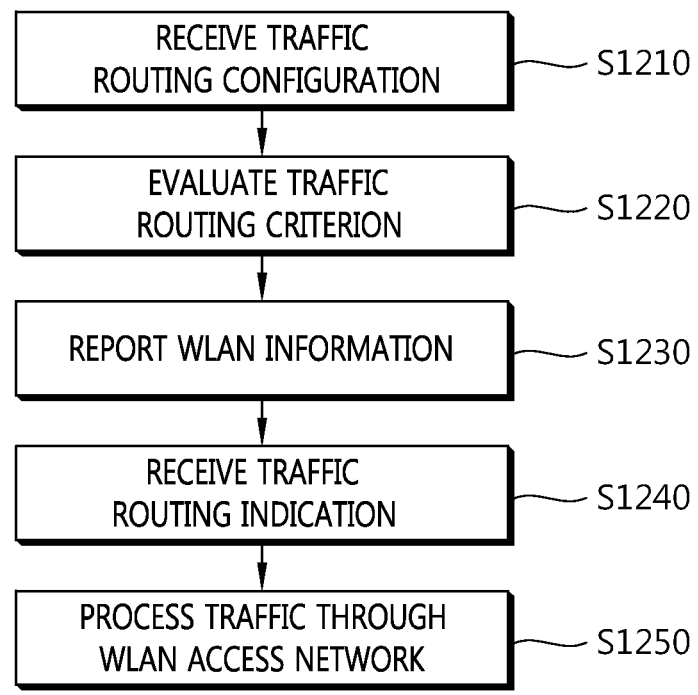
FIG. 12 is a diagram illustrating a communication method according to a second embodiment of the present invention.

FIG. 12 is a diagram illustrating a communication method according to a second embodiment of the present invention.

Referring to FIG. 12, the terminal receives the traffic routing configuration and evaluates the traffic routing criterion. This may be performed in the scheme described through steps S1010 and S120 in the embodiment of FIG. 10 and a detailed description thereof will be omitted.

The terminal determining that the discovered concerned WLAN satisfies the traffic routing criterion generates WLAN information on the concerned WLAN and reports the generated WLAN information (S1210). The generated WLAN information may be notified to the 3GPP access network. The generated WLAN information may be notified to the 3GPP access network while being included in the RRC message. When the plurality of concerned WLANs is discovered and the corresponding concerned WLANs satisfy the traffic routing criteria according to the related routing events, the terminal may generate and report the information on each concerned WLAN.

The WLAN information notified to the 3GPP access network may include the following information.

1) Identifier of Concerned WLAN

The WLAN information reported by the terminal may include an identifier of the concerned WLAN. The identifier of the concerned WLAN may include at least one of the BSSID, the SSID, the HESSID, and the domain name list of the concerned WLAN.

Meanwhile, one concerned WLAN identifier is included in the concerned WLAN list included in the traffic routing configuration and when the terminal reports the WLAN information according to the corresponding traffic routing configuration, the terminal may make the identifier of the concerned WLAN not be included in the WLAN information. The reason is that since there is only one concerned WLAN in which the 3GPP traffic processing is permitted, a separate indication indicating on which concerned WLAN the WLAN information is information is not required.

2) Positional Information of Concerned WLAN

The terminal may make positional information of the concerned WLAN that satisfies the traffic routing criterion be included in the WLAN information. The positional information of the concerned WLAN may be implemented as geometric coordinate information. In this case, the positional information of the concerned WLAN may include at least one of latitude, longitude, altitude, and a radius.

3) Signal Characteristics of Concerned WLAN

The terminal may make signal characteristics of the concerned WLAN that satisfies the traffic routing criterion be included in the WLAN information. The signal characteristics may be acquired through a signal strength of the corresponding concerned WLAN. For example, the terminal measures a reception signal while receiving the beacon frame periodically transmitted by the concerned WLAN to find the signal strength of the concerned WLAN. Alternatively, the terminal performs the measurement while receiving the probe response frame during the active scanning procedure with the concerned WLAN to find the signal strength of the concerned WLAN. The signal characteristics of the concerned WLAN may be specified by a received signal strength indicator (RSSI) or a received strength carrier pilot (RSCP).

4) Channel Information of Concerned WLAN

The terminal may make channel information of the concerned WLAN that satisfies the traffic routing criterion be included in the WLAN information. Herein, the channel corresponds to a physical medium having a specific frequency band and a specific bandwidth unlike a channel discussed in the 3GPP access network and hereinafter, the channel/frequency will be referred to as a WLAN channel for distinguishing from the channel in the 3GPP access network. The channel information of the concerned WLAN may include at least one of a primary channel, at least one or more secondary channels, and a support channel bandwidth operated by the concerned WLAN for an operation.

5) WLAN Protocol Information of Concerned WLAN

The terminal may make WLAN protocol information of the concerned WLAN that satisfies the traffic routing criterion be included in the WLAN information. The WLAN protocol may be at least one or more protocols of protocols according to WLAN standards which are currently discussed, such as 802.11b, 802.11g, 802.11ac, 802.11n, and the like.

6) Priority Information of Concerned WLAN

The plurality of concerned WLANs is discovered and when the plurality of concerned WLANs satisfies the traffic routing criteria, respectively, the terminal may make priority information on the plurality of concerned WLANs be included in the WLAN information. When a priority is set in the terminal in advance or set by the 3GPP access network in advance, the priority may be applied to the concerned WLAN and in this case, the terminal may make the priority be included in the WLAN information. When one concerned WLAN satisfies the report event, the terminal may make the priority information be included or not included in the WLAN information so as to indicate that the concerned WLAN has a highest priority.

7) Preference Information Between Concerned WLAN and 3GPP Access Network

The terminal may make preference information indicating a preferred network between the concerned WLAN that satisfies the traffic routing criterion and the 3GPP access network which the current terminal camps on be included in the WLAN information. The preference information may indicate whether the concerned WLAN is preferred to the current 3GPP access network or otherwise. Meanwhile, the preference information may be set to indicate that preference levels of the concerned WLAN and the 3GPP access network are equivalent to each other.

The terminal may decide the preference information based on a predetermined rule and/or user's preference. The terminal may decide the preference information based on comparison between a predetermined priority of the concerned WLAN and the priority of the current 3GPP access network.

8) Association Information.

The terminal may make association information associated with the concerned WLAN that satisfies the traffic routing criterion be included in the WLAN information. The association information may indicate whether the terminal may successfully perform the association procedure with the corresponding concerned WLAN. In this case, the terminal may attempt the association procedure with the corresponding concerned WLAN before reporting the WLAN information to the network.

To this end, the 3GPP access network may provide support information required to the association procedure of the terminal to the terminal before reporting the WLAN information. Alternatively, the terminal may attempt the association through the system information of the concerned WLAN included in the beacon frame and/or probe response frame and decide whether the association is successful during the scanning procedure. Alternatively, the terminal may decide whether the association is successful without the attempt at the association through the system information of the concerned WLAN included in the beacon frame and/or probe response frame during the scanning procedure.

9) Authentication Information

The terminal may make authentication information associated with the concerned WLAN that satisfies the traffic routing criterion be included in the WLAN information. The authentication information may be implemented as follows.

The authentication information may indicate a security algorithm applied to the current concerned WLAN.

The authentication information may indicate whether the terminal may successfully perform the authentication procedure with the corresponding concerned WLAN. In this case, the terminal may attempt the authentication procedure with the corresponding concerned WLAN before reporting the WLAN information to the network. To this end, the 3GPP access network may provide support information required to the authentication procedure of the terminal to the terminal before reporting the WLAN information. Alternatively, the terminal may attempt the authentication through the system information of the concerned WLAN included in the beacon frame and/or probe response frame and decide whether the authentication is successful during the scanning procedure. Alternatively, the terminal may decide whether the authentication is successful without the attempt at the authentication through the system information of the concerned WLAN included in the beacon frame and/or probe response frame during the scanning procedure.

The 3GPP access network that receives the WLAN information from the terminal may decide whether the traffic is routed based on the WLAN information. For example, it may be decided whether the concerned WLAN is the WLAN access network appropriate to processing the 3GPP traffic based on the priority information, the association information, and the authentication information of the concerned WLAN included in the WLAN information. The 3GPP access network that decides that the corresponding concerned WLAN is appropriate to processing the 3GPP traffic transmits a traffic routing indication to the terminal as a response to the WLAN information reporting.

The terminal receives the traffic routing indication as the response to the WLAN information reporting (S1220). The traffic routing indication may include an identifier of a target WLAN access network entity to which the terminal will route the 3GPP traffic.

The terminal that receives the traffic routing indication may access the concerned WLAN and route and process the traffic to the WLAN access network. Since processing the traffic through the WLAN access network may follow S1030 of the embodiment illustrated in FIG. 10, a detailed description will be omitted.

Figure 13:
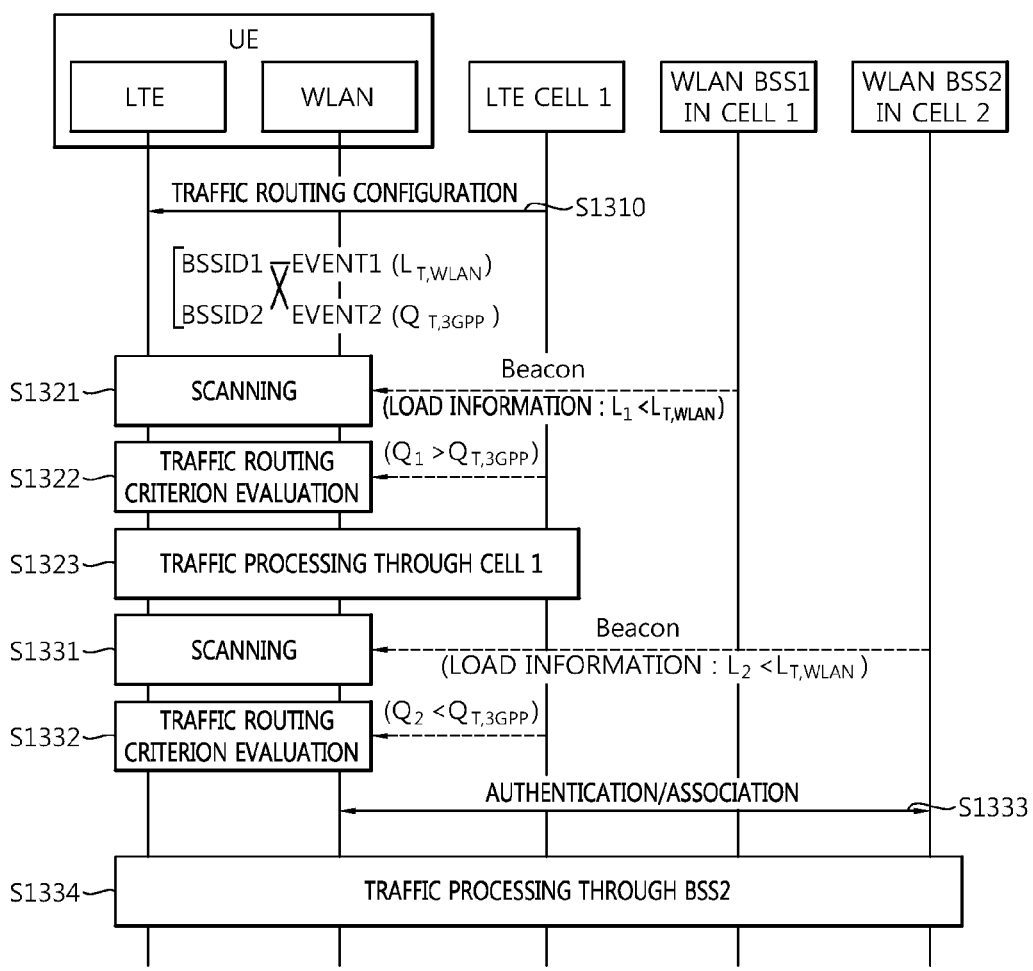
FIG. 13 is a diagram illustrating an example of a method for processing traffic according to an embodiment of the present invention.

FIG. 13 is a diagram illustrating an example of a method for processing traffic according to an embodiment of the present invention.

Referring to FIG. 13, it is assumed that the terminal supports both communication based on LTE and communication based on the WLAN and it is assumed that the LTE communication and the WLAN communication may be independently performed. It is assumed that the terminal camps on the cell 1 based on the LTE and/or the terminal receives the service by establishing the connection with the cell 1. It is assumed that the BSS1 and the BSS2 are extended in coverage of the cell 1.

The terminal receives the traffic routing configuration from the cell 1 (S1310). The traffic routing configuration includes the concerned WLAN list and the routing event.

The concerned WLAN list includes BSSID1 and BSSID2. Therefore, the concerned WLAN may be specified by the BSS1 and the BSS2.

The routing event may include routing event 1 that specifies a condition in which a load of the WLAN access network is smaller than a specific threshold value. The routing event may include routing event 2 that specifies a condition in which signal quality of the 3GPP access network is smaller than a specific threshold value.

The BSS1 is correlated with the routing event 1 and the routing event 2. Further, the BSS2 is correlated with the routing event 1.

The terminal performs scanning to discover the concerned WLAN (S1321). The terminal may perform the passive scanning. Through the passive scanning, the terminal receives the beacon frame transmitted from the AP of the BSS1 to discover the BSS1. The BSSID of the BSS1 and the system information for operating the WLAN in the BSS1 may be included in the beacon frame. Load information of the BSS1 may be included in the system information of the beacon frame and the load information may indicate $L_1$ as a load of the BSS1.

The terminal evaluates whether the BSS1 satisfies the traffic routing criterion (S1322). The terminal may evaluate whether the routing event 1 and the routing event 2 are satisfied in order to determine whether the BSS1 satisfies the traffic routing criterion.

The terminal may determine whether a condition according to the routing event 1 is satisfied through the load information of the BSS1 acquired through the scanning. The load of the BSS1 as $L_1$ is smaller than $L_{T,WLAN}$ which is a WLAN load threshold value. Therefore, it may be decided that the BSS1 satisfies the routing event 1.

The terminal measures the signal quality of the cell 1 which is the current serving cell and determines whether a measurement result satisfies a condition according to the routing event 2. Q1, the measurement result of the cell 1 which is the current serving cell is larger than $Q_{T,3GPP}$ which is a 3GPP quality threshold value. Therefore, it may be decided that the routing event 2 is not satisfied. Accordingly, the terminal may decide that the BSS1 may not satisfy the traffic routing criterion and decide that the BSS1 is not appropriate to processing the 3GPP traffic.

As a result, the terminal does not route the 3GPP traffic to the BSS1 and processes the 3GPP traffic through the cell 1 (S1323).

The terminal performs scanning for searching the concerned WLAN (S1331). The terminal may perform the passive scanning. Through the passive scanning, the terminal receives the beacon frame transmitted from the AP of the BSS2 to discover the BSS2. The BSSID of the BSS2 and the system information for operating the WLAN in the BSS2 may be included in the beacon frame. Load information of the BSS2 may be included in the system information of the beacon frame and the load information may indicate $L_2$ as the load of the BSS1.

The terminal evaluates whether the BSS2 satisfies the traffic routing criterion (S1332). The terminal may evaluate whether the routing event 1 is satisfied in order to determine whether the BSS2 satisfies the traffic routing criterion.

The terminal may determine whether the condition according to the routing event 1 is satisfied through the load information of the BSS2 acquired through the scanning. The load of the BSS2 as $L_2$ is smaller than $L_{T,WLAN}$ which is the WLAN load threshold value. Therefore, it may be decided that the BSS2 satisfies the routing event 1. The terminal decides that the BSS2 satisfies the traffic routing criterion.

Meanwhile, since the BSS2 is not associated with the routing event 2, the terminal does not determine whether the signal quality of the cell 1 which is the serving cell satisfies the condition according to the routing event 2. For example, although Q2, the measurement result of the cell 1 is higher than $Q_{T,3GPP}$ which is the 3GPP quality threshold value, the terminal may decide that the traffic routing criterion is satisfied.

The terminal performs the association/authentication procedure to perform the WLAN communication in the BSS2 (S1333). The terminal transmits and receives the authentication frame to and from the AP of the BSS2 and exchanges the association request frame and the association response frame to perform the authentication and association procedures.

The terminal processes the traffic through the AP of the BSS2 (S1334). Meanwhile, if possible, the terminal may process the traffic through the cell 1 while processing the traffic through the AP of the BSS2. In this case, what degree of traffic among all traffic to process through the WLAN access network may be adaptively decided according to the service environment in the cell 1 and the BSS1.

Figure 14:
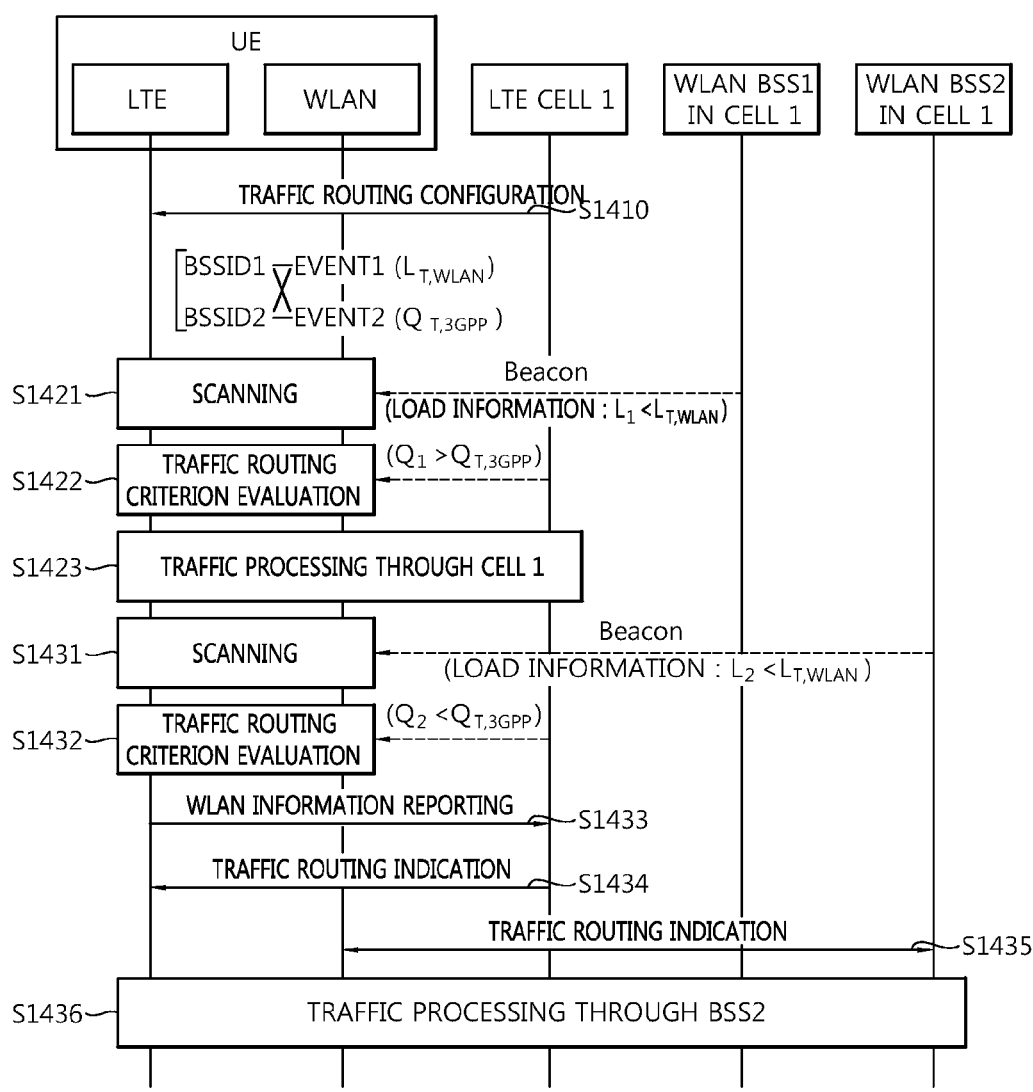
FIG. 14 is a diagram illustrating another example of the method for processing traffic according to the embodiment of the present invention.

FIG. 14 is a diagram illustrating another example of the method for processing traffic according to the embodiment of the present invention.

Referring to FIG. 14, it is assumed that the terminal supports both the communication based on the LTE and the communication based on the WLAN and it is assumed that the LTE communication and the WLAN communication may be independently performed. It is assumed that the terminal camps on the cell 1 based on the LTE and/or the terminal receives the service by establishing the connection with the cell 1. It is assumed that the BSS1 and the BSS2 are extended in coverage of the cell 1.

The terminal receives the traffic routing configuration from the cell 1 (S1410). The traffic routing configuration includes the concerned WLAN list and the routing event.

The concerned WLAN list includes BSSID1 and BSSID2. Therefore, the concerned WLAN may be specified by the BSS1 and the BSS2.

The routing event may include routing event 1 that specifies a condition in which the load of the WLAN access network is smaller than a specific threshold value. The routing event may include routing event 2 that specifies a condition in which the signal quality of the 3GPP access network is smaller than a specific threshold value.

The BSS1 and the BSS2 are correlated with the routing event 1 and the routing event 2.

The terminal performs scanning for searching the concerned WLAN (S1421). The terminal may perform the passive scanning. Through the passive scanning, the terminal receives the beacon frame transmitted from the AP of the BSS1 to discover the BSS1. The BSSID of the BSS1 and the system information for operating the WLAN in the BSS1 may be included in the beacon frame. The load information of the BSS1 may be included in the system information of the beacon frame and the load information may indicate $L_1$ as the load of the BSS1.

The terminal evaluates whether the BSS1 satisfies the traffic routing criterion (S1422). The terminal may evaluate whether the routing event 1 and the routing event 2 are satisfied in order to determine whether the BSS1 satisfies the traffic routing criterion.

The terminal may determine whether the condition according to the routing event 1 is satisfied through the load information of the BSS1 acquired through the scanning. The load of the BSS1 as $L_1$ is smaller than $L_{T,WLAN}$ which is the WLAN load threshold value. Therefore, it may be decided that the BSS1 satisfies the routing event 1.

The terminal measures the signal quality of the cell 1 which is the current serving cell and determines whether the measurement result satisfies the condition according to the routing event 2. Q1, the measurement result of the cell 1 which is the current serving cell is larger than $Q_{T,3GPP}$ which is the 3GPP quality threshold value. Therefore, it may be decided that the routing event 2 is not satisfied. Accordingly, the terminal may decide that the BSS1 may not satisfy the traffic routing criterion and decide that the BSS1 is not appropriate to processing the 3GPP traffic.

As a result, the terminal decides not to generate and report the WLAN information for the BSS1 and processes the 3GPP traffic through the cell 1 (S1423).

The terminal performs scanning for searching the concerned WLAN (S1431). The terminal may perform the passive scanning. Through the passive scanning, the terminal receives the beacon frame transmitted from the AP of the BSS2 to discover the BSS2. The BSSID of the BSS2 and the system information for operating the WLAN in the BSS2 may be included in the beacon frame. The load information of the BSS2 may be included in the system information of the beacon frame and the load information may indicate $L_2$ as the load of the BSS2.

The terminal evaluates whether the BSS2 satisfies the traffic routing criterion (S1432). The terminal may evaluate whether the routing event 1 and the routing event 2 are satisfied in order to determine whether the BSS2 satisfies the traffic routing criterion.

The terminal may determine whether the condition according to the routing event 1 is satisfied through the load information of the BSS2 acquired through the scanning. The load of the BSS2 as $L_2$ is smaller than $L_{T,WLAN}$ which is the WLAN load threshold value. Therefore, it may be decided that the BSS2 satisfies the routing event 1.

The terminal measures the signal quality of the cell 1 which is the current serving cell and determines whether the measurement result satisfies the condition according to the routing event 2. Q2, the measurement result of the cell 1 which is the current serving cell is smaller than $Q_{T,3GPP}$ which is the 3GPP quality threshold value. Therefore, it may be decided that the routing event 2 is satisfied. Therefore, the terminal decides that the BSS2 satisfies the traffic routing criterion.

The terminal generates the WLAN information for the BSS2 and reports the generated WLAN information to the cell 1 (S1433). The WLAN information for the BSS2 may be generated based on the system information included in the beacon frame received from the BSS2 during the scanning step, S1431. Alternatively, the terminal may receive the beacon frame periodically transmitted from the BSS2 and generate the WLAN information for the BSS2 based on the system information included therein. The WLAN information for the BSS2 may be implemented together with the WLAN information described with reference to FIG. 10.

The cell 1 transmits the traffic routing indication to the terminal as a response to a WLAN information reporting configuration (S1434). The traffic routing indication may be configured to indicate the terminal to route and process the traffic to the BSS2.

The terminal performs the association/authentication procedure to perform the WLAN communication in the BSS2 (S1435). The terminal transmits and receives the authentication frame to and from the AP of the BSS2 and exchanges the association request frame and the association response frame to perform the authentication and association procedures.

The terminal processes the traffic through the AP of the BSS2 (S1436). Meanwhile, if possible, the terminal may process the traffic through the cell 1 while processing the traffic through the AP of the BSS2. In this case, what degree of traffic among all traffic to process through the WLAN access network may be adaptively decided according to the service environment in the cell 1 and the BSS1.

The terminal and the base station performs configuring/evaluating the traffic routing criterion, information reporting, and traffic processing through the WLAN in the aforementioned embodiment, but the present invention is not limited thereto. That is, the traffic routing criterion for the general non-3GPP access network may be configured/evaluated and the terminal may generate the information on the non-3GPP access network and report the generated information to the network. Further, the terminal may process some or all of the traffic through the non-3GPP access network.

According to the communication method of the embodiment of the present invention, the traffic routing criterion is provided to the terminal, and as a result, the terminal may determine the non-3GPP access network appropriate to the traffic processing and process the traffic through the corresponding non-3GPP access network. Further, the terminal may report to the network information on the non-3GPP access network determined according to the traffic routing criterion. The base station may allow the terminal to route some or all of the 3GPP traffic to the appropriate non-3GPP access network and process the routed 3GPP traffic. The terminal routes and processes the traffic to the appropriate non-3GPP access network to guarantee the service quality provided to the terminal and reduce the load of the 3GPP access network.

Figure 15:
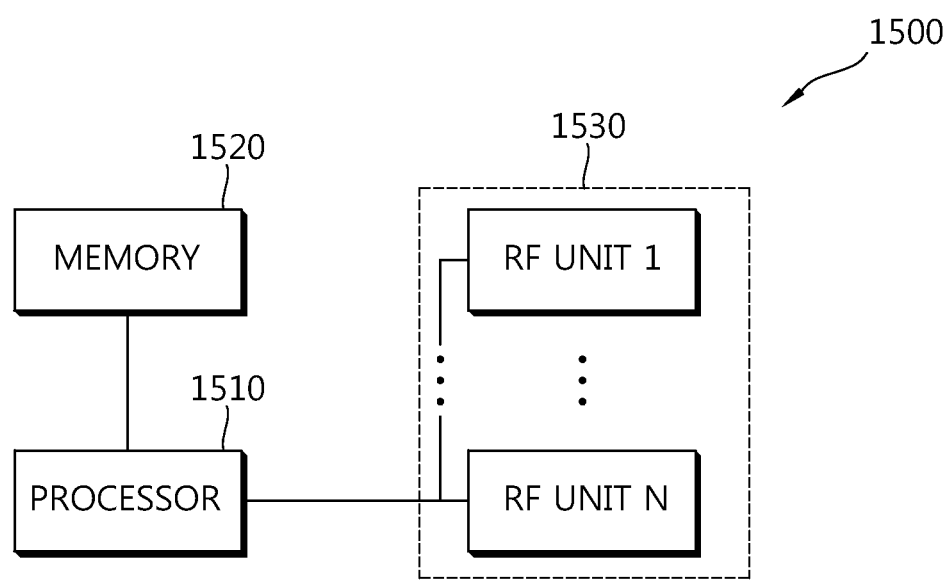
FIG. 15 is a block diagram illustrating a wireless apparatus in which the embodiment of the present invention can be implemented.

FIG. 15 is a block diagram illustrating a wireless apparatus in which the embodiment of the present invention can be implemented. The apparatus may implement the terminal and/or network (base station or another network entity) in the embodiments of FIGS. 10 to 14.

Referring to FIG. 15, the wireless apparatus 1500 includes a processor 1510, a memory 1520, and a radio frequency (RF) unit 1530.

The processor 1510 implements a function, a process, and/or a method which are proposed. The processor 1510 may be set to configure the traffic routing criterion and/or evaluate whether the traffic routing criterion is satisfied in order to process the 3GPP traffic through the non-3GPP access network according to the embodiment of the present invention. The processor 1510 is configured to generate information on the non-3GPP access network and report the generated information. The processor 1510 may be configured to indicate the traffic processing through the traffic routing to the non-3GPP access network. The processor 1510 is configured to process the traffic through the 3GPP access network and/or the non-3GPP access network. The processor 1510 may be configured to perform the embodiment of the present invention described with reference to FIGS. 10 to 14.

The RF unit 1530 is connected with the processor 1510 to transmit and receive a radio signal. The RF unit 1530 may include one or more RF units for 3GPP based access network communication and non-3GPP based access network communication.

The processor may include an application-specific integrated circuit (ASIC), different chip sets, a logic circuit, and/or a data processing apparatus. In FIG. 15, it is illustrated that the single processor 1510 is configured to control and manage all RF units for each access network communication, but the wireless apparatus according to the present invention is not limited thereto. An embodiment in which the respective RF units for each access network communication are functionally coupled with the respective processors may be available.

The memory 1520 may include a read-only memory (ROM), a random access memory (RAM), a flash memory, a memory card, a storage medium, and/or other storage devices. The RF unit 1530 may include a baseband circuit for processing the radio signal. When the exemplary embodiment is implemented by software, the aforementioned technique may be implemented by a module (a process, a function, and the like) performing the aforementioned function. The module may be stored in the memory 1520 and executed by the processor 1510. The memory 1520 may be present inside or outside the processor 1510 and connected with the processor 1510 by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for communicating with networks, performed by a user equipment (UE), the method comprising:
    accessing a first network;
    receiving, from the first network, information relevant for traffic steering to a second network that can process traffic related to the first network; and
    steering traffic from the first network to the second network based on the information relevant for traffic steering,
    wherein the information relevant for traffic steering comprises load information of the second network and a signal quality of the second network,
    wherein the steering comprises determining whether the traffic related to the first network is allowed to be transmitted from the first network to the second network according to the acquired load information, the acquired signal quality, and threshold values,
    wherein the threshold values comprise a first threshold value related with a low signal quality of the second network, a second threshold value related with a high signal quality of the second network, a third threshold value related with a low load of the second network, a fourth threshold value related with a high load of the second network,
    wherein the traffic is allowed to be transmitted from the first network to the second network, when the acquired signal quality of the second network is greater than the second threshold value and when the acquired load of the second network is lower than the third threshold value, and wherein the first network is an evolved-UMTS terrestrial radio access network (E-UTRAN) and the second network is a wireless location area network (WLAN).

2. The method of claim 1, further comprising:
receiving, by the UE, an identity list of the second network.

3. The method of claim 2, wherein the identity list of the second network provides at least one of service set identifier (SSID), basic service set identifier (BSSID) and homogenous extended service set identifier (HESSID) of the second network.

4. The method of claim 3, wherein only the SSID, BSSID and HESSID provided in the identity list of the second network are considered for determining whether the traffic related to the first network is allowed to be transmitted from the first network to the second network.

5. The method of claim 1, wherein the information relevant for traffic steering is received through system information transmitted by the first network.

6. The method of claim 1, wherein the information relevant for traffic steering is broadcast by the first network.

7. A user equipment (UE) for communicating with networks, the UE comprising:
a transceiver configured to transmit and receive a radio signal; and
a processor coupled to the transceiver, wherein the processor is configured to:
access a first network;
receive, from the first network, information relevant for traffic steering to a second network that can process traffic related to the first network; and
steer traffic from the first network to the second network based on the information relevant for traffic steering,
wherein the information relevant for traffic steering comprises load information of the second network and a signal quality of the second network,
wherein the steering comprises determining whether the traffic related to the first network is allowed to be transmitted from the first network to the second network according to the acquired load information, the acquired signal quality, and threshold values,
wherein the threshold values comprise a first threshold value related with a low signal quality of the second network, a second threshold value related with a high signal quality of the second network, a third threshold value related with a low load of the second network, a fourth threshold value related with a high load of the second network,
wherein the traffic is allowed to be transmitted from the first network to the second network, when the acquired signal quality of the second network is greater than the second threshold value and when the acquired load of the second network is lower than the third threshold value, and
wherein the first network is an evolved-UMTS terrestrial radio access network (E-UTRAN) and the second network is a wireless location area network (WLAN).

* * * * *